US006261343B1

(12) United States Patent
Golden et al.

(10) Patent No.: US 6,261,343 B1
(45) Date of Patent: Jul. 17, 2001

(54) USE OF ACTIVATED CARBON ADSORBENT IN ARGON AND/OR OXYGEN CONTROLLING HYDROGEN PSA

(75) Inventors: Timothy Christopher Golden, Allentown; Thomas Stephen Farris, Bethlehem, both of PA (US); Robin Joyce Maliszewskyj, Middletown, MD (US); Tracey A Cook, Blandon, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 09/260,294

(22) Filed: Mar. 2, 1999

(51) Int. Cl.$^7$ ................................................ B01D 53/047
(52) U.S. Cl. .................. 95/96; 95/127; 95/130; 95/138; 95/140
(58) Field of Search .................. 95/96–98, 100–105, 95/127, 130, 138–140

(56) References Cited

U.S. PATENT DOCUMENTS

| 3,176,444 | | 4/1965 | Kiyonaga ............................... 55/26 |
| 3,430,418 | | 3/1969 | Wagner .................................. 55/25 |
| 3,564,816 | | 2/1971 | Batta ...................................... 55/26 |
| 3,702,525 | * | 11/1972 | Simonet et al. .................. 95/127 X |
| 3,839,847 | * | 10/1974 | Banikiotes et al. .............. 95/127 X |
| 3,986,849 | | 10/1976 | Fuderer et al. ....................... 55/25 |
| 4,077,779 | * | 3/1978 | Sircar et al. ..................... 95/139 X |
| 4,077,780 | | 3/1978 | Doshi ..................................... 55/26 |
| 4,512,780 | * | 4/1985 | Fuderer ............................. 95/127 X |
| 4,696,680 | * | 9/1987 | Ghate et al. ..................... 95/140 X |
| 5,015,272 | * | 5/1991 | Okada et al. ..................... 95/140 X |
| 5,112,590 | * | 5/1992 | Krishnamurthy et al. ......... 95/140 X |
| 5,154,736 | * | 10/1992 | Mifflin ............................. 95/139 X |
| 5,248,322 | * | 9/1993 | Kumar ............................. 95/140 X |
| 5,250,088 | * | 10/1993 | Yamaguchi et al. .............. 95/140 X |
| 5,294,247 | * | 3/1994 | Scharpf et al. ................... 95/140 X |
| 5,354,346 | * | 10/1994 | Kumar ............................. 95/140 X |
| 5,505,764 | * | 4/1996 | Fuentes ............................. 95/140 X |

FOREIGN PATENT DOCUMENTS

| 1443943 | * | 12/1988 | (SU) ..................................... 95/140 |

OTHER PUBLICATIONS

Translation of Russian Inventor Certificate No. 1443943 A1, Entitled "A Method of Purification of a Hydrogen–Containing Gas", (Authors: Furmer, Yu. B., Leites, I. L., Mamedov, A. A., Karpove, Yu. G., Kerbutov, S. B., and Yudine, B.B.) pp. 2–5.

* cited by examiner

*Primary Examiner*—Robert H. Spitzer
(74) *Attorney, Agent, or Firm*—Geoffrey L. Chase

(57) ABSTRACT

The present invention provides a pressure swing adsorption process. The process includes providing a pressure swing adsorption apparatus having a discharge end adsorption layer of activated carbon, feeding through the apparatus a feed gas including hydrogen, carbon monoxide and at least one of argon and oxygen, and collecting a product gas from the apparatus, wherein the product gas is high purity hydrogen. Also provided is a method for decreasing an amount of impurities in a product gas from a pressure swing adsorption process for separating hydrogen from impurities including carbon monoxide, and at least one of argon and oxygen. The method includes providing an improved adsorption layer in at least a discharge end of a pressure swing adsorption apparatus in which the pressure swing adsorption process is conducted, wherein the improved adsorption layer includes activated carbon in an amount effective to: (a) decrease the amount of impurities in the product gas; (b) increase a time until initial impurity breakthrough; and (c) improve hydrogen recovery of the process.

25 Claims, No Drawings

USE OF ACTIVATED CARBON ADSORBENT IN ARGON AND/OR OXYGEN CONTROLLING HYDROGEN PSA

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to pressure swing adsorption (PSA) processes, and more particularly to hydrogen production via pressure swing adsorption processes.

The process of production and recovery of hydrogen by steam and/or air reforming of hydrocarbon rich gas streams, such as natural gas, naphtha, or other mixtures of low molecular weight hydrocarbons, is well known in the art. Typical commercial sources for the production of hydrogen include reforming of natural gas or partial oxidation of various hydrocarbons. The reforming is carried out by reacting the hydrocarbon with steam and/or with oxygen-containing gas (e.g., air or oxygen-enriched air), producing a hydrogen gas stream containing accompanying amounts of oxides of carbon, water, residual methane and nitrogen. Unless it is desired to recover carbon monoxide, it is customarily converted to carbon dioxide by water gas shift reaction to maximize the hydrogen content in the stream. Typically, this gas stream is then sent to a PSA unit. Other hydrogen-rich gas sources that can be upgraded by PSA technology to a high purity product include refinery off-gases with $C_1$–$C_6$ hydrocarbon contaminants. See, e.g., U.S. Pat. No. 3,176,444 to Kiyonaga.

In PSA processes, a multi-component gas is passed to at least one of a plurality of adsorption beds at an elevated pressure to adsorb at least one strongly adsorbed component while at least one relatively weakly adsorbed component passes through. In the case of hydrogen production via pressure swing adsorption ($H_2$ PSA), $H_2$ is the weakly adsorbed component which passes through the bed. See, e.g., U.S. Pat. Nos. 3,430,418 to Wagner, 3,564,816 to Batta and 3,986,849 to Fuderer et al. At a defined time, the feed step is discontinued and the adsorption bed is depressurized in one or more steps which permits essentially pure $H_2$ product to exit the bed. Then a countercurrent desorption step is carried out, followed by countercurrent purge and repressurization. $H_2$ PSA vessels generally contain a mixture of activated carbon, for bulk $CO_2$ and $CH_4$ removal, followed by a molecular sieve for CO and $N_2$ removal. See, e.g., U.S. Pat. No. 3,430,418 to Wagner.

$H_2$ PSA is a multi-million dollar industry supplying high purity hydrogen for chemical producing industries, metal refining industries and other related industries. The cost of hydrogen from integrated reformer/PSA systems is impacted by both the capital and operating costs of the system. Clearly, economic production of hydrogen requires as low as possible operating and capital costs. Capital cost is largely dictated by the size of the reformer and the size of the PSA beds. PSA bed size decreases as the hydrogen productivity (lb-moles of hydrogen produced/bed volume) of the PSA increases. Hydrogen productivity can be increased by either improved process cycles or improved adsorbents. The size of the reformer is impacted mostly by the hydrogen recovery of the PSA. Improvements in hydrogen recovery in the PSA results in smaller reformer size (as there is a diminished need to produce hydrogen out of the reformer because of better recovery in the PSA). Improvements in hydrogen recovery also result in a reduced demand for reformer feed gas, i.e., natural gas, which generally constitutes the largest operating cost of the reformer. Hydrogen recovery in the PSA can also be improved by either improved process cycles or improved adsorbents.

$H_2$ PSA process performance (on-line time, productivity, product purity) is largely dictated by the most weakly adsorbing component in the $H_2$-rich stream. A bed can stay on feed, producing pure $H_2$, only until the level of impurity breakthrough reaches the desired product purity. For steam/methane reformer (SMR) cases, the PSA feed gas composition is typically about 1% $N_2$, 5% $CH_4$, 5% CO, 18% $CO_2$ and the remainder $H_2$. To produce high purity $H_2$ (99.99+%) with this feed gas composition, $N_2$ is the key breakthrough component since it is the most weakly adsorbing feed gas component. Since $N_2$ is the key breakthrough component, it has been common practice to place a zeolite adsorbent with high capacity for $N_2$ at the product end of the bed. See, e.g., U.S. Pat. No. 3,430,418 to Wagner, which teaches a layered adsorption zone with the inlet material comprising activated carbon and the discharge end containing zeolite for removing the minor component of $N_2$, CO or $CH_4$; U.S. Pat. No. 3,564,816 to Batta, which exemplifies only the use of CaA zeolite for $H_2$ PSA processing; and U.S. Pat. No. 3,986,849 to Fuderer et al., which teaches a layered bed adsorption zone with activated carbon at the feed end of the bed and CaA zeolite at the discharge end.

The $H_2$-rich gas stream may also contain oxygen and argon impurities, particularly if partial oxidation of hydrocarbons is the route to hydrogen production. Since these impurities are more weakly adsorbing on zeolite adsorbent than $N_2$, their breakthrough determines bed on-line times and product purity. However, there is very little prior art specifically teaching about Ar and/or $O_2$ removal from the $H_2$-rich gas streams.

U.S. Pat. No. 3,430,418 to Wagner discloses Ar as a selectively adsorbable feed gas component and teaches a layered carbon/zeolite adsorption zone, failing to appreciate the surprising disadvantages of using a zeolite-based adsorbent for $H_2$ PSA with gas streams containing Ar in addition to $H_2$, CO, $N_2$, etc. The layered adsorption zone comprises a first layer of activated carbon for water, methane and $CO_2$ removal, followed by a zeolite layer for CO and $N_2$ removal. Wagner also teaches an all zeolite adsorption zone for $H_2$ PSA applications.

U.S. Pat. No. 3,564,816 to Batta also mentions Ar as a feed gas component and teaches a single adsorption zone of zeolite.

U.S. Pat. No. 3,176,444 to Kiyonaga describes appropriate adsorbents for given PSA separations. The removal of Ar and/or $O_2$ from $H_2$ is not addressed.

U.S. Pat. No. 4,077,780 to Doshi teaches a PSA process for the recovery of $H_2$ and $N_2$ from ammonia plant purge gas. The process comprises the use of activated carbon as the preferred adsorbent, and operation beyond the point of $CH_4$ breakthrough in the course of the adsorbent bed void gas recovery steps, to allegedly reject substantial amounts of Ar and $CH_4$ per unit amount of $N_2$ and $H_2$ produced. This process is unsuitable for producing high purity $H_2$, as the product gas contains unacceptably high levels of impurities, such as $N_2$ and Ar.

The inventors are not aware of any prior art patents which mention $O_2$ removal from $H_2$-rich PSA feed streams.

Accordingly, there has been a need for improved $H_2$ PSA processes comprising the use of preferred adsorbents to isolate high purity $H_2$ from gas streams containing $H_2$, CO, and $O_2$ impurities and/or Ar impurities.

All references cited herein are incorporated herein by reference in their entireties.

BRIEF SUMMARY OF THE INVENTION

The present invention provides a pressure swing adsorption process comprising:

providing a pressure swing adsorption apparatus comprising a discharge end adsorption layer consisting essentially of activated carbon;

feeding through said pressure swing adsorption apparatus a feed gas comprising hydrogen, carbon monoxide and at least one of argon and oxygen;

collecting a product gas from said pressure swing adsorption apparatus, wherein said product gas consists essentially of hydrogen.

In embodiments, the feed gas comprises hydrogen and 0.01 to 10% of at least one of oxygen and argon.

In embodiments, the feed gas comprises 40 to 98% hydrogen, 0.1 to 10% carbon monoxide and 0.01 to 10% of at least one of oxygen and argon.

In embodiments, the feed gas comprises 40 to 98% hydrogen, 0.1 to 10% carbon monoxide, 0.1 to 5% nitrogen and 0.01 to 10% of at least one of oxygen and argon.

In embodiments, the feed gas comprises 40 to 95% hydrogen, 0.1 to 5% carbon monoxide, and 0.1 to 10% of at least one of oxygen and argon.

In embodiments, the hydrogen recovery is at least 60%.

In embodiments, the product gas comprises at least 99.9% hydrogen and more preferably at least 99.99% hydrogen.

In embodiments, collecting is terminated when a substantial amount of at least one of argon and oxygen breaks through the pressure swing adsorption apparatus. The substantial amount can be about 1000 ppm, 100 ppm, 10 ppm or 1 ppm in certain of these embodiments.

In embodiments, an initial impurity breakthrough is delayed relative to an initial impurity breakthrough of the process performed with a discharge end adsorption layer which does not consist essentially of activated carbon.

In embodiments, a hydrogen recovery is higher than a hydrogen recovery of the process performed with a discharge end adsorption layer which does not consist essentially of activated carbon.

In embodiments, all adsorption layers of the pressure swing adsorption apparatus consist essentially of activated carbon.

In embodiments, an inlet adsorption layer of the pressure swing adsorption apparatus consists essentially of activated carbon. In certain of these embodiments, an intermediate adsorption layer of the pressure swing apparatus comprises a zeolite adsorbent.

In embodiments, the feed gas comprises hydrogen and 0.01 to 10% oxygen.

In embodiments, the feed gas consists essentially of 40 to 95% hydrogen, 0.1 to 5% carbon monoxide, 0.01 to 10% oxygen, 0 to 5% nitrogen, 0 to 10% carbon dioxide and 0 to 10% methane.

In embodiments, the feed gas comprises hydrogen and 0.01 to 10% argon.

In embodiments, the feed gas consists essentially of 40 to 95% hydrogen, 0.1 to 5% carbon monoxide, 0.01 to 10% argon, 0 to 5% nitrogen, 0 to 10% carbon dioxide and 0 to 10% methane.

Also provided is a method for decreasing an amount of impurities in a product gas from a pressure swing adsorption process for separating hydrogen from impurities including carbon monoxide, and at least one of argon and oxygen, said method comprising providing an improved adsorption layer in at least a discharge end of a pressure swing adsorption apparatus in which said pressure swing adsorption process is conducted, wherein said improved adsorption layer comprises activated carbon in an amount effective to: (a) decrease said amount of said impurities in said product gas; (b) increase a time until initial impurity breakthrough; and (c) improve a hydrogen productivity of said process.

In embodiments, the improved adsorption layer is substantially devoid of zeolites.

In embodiments, the improved adsorption layer consists essentially of activated carbon.

In embodiments, the improved adsorption layer comprises at least 50% activated carbon.

In embodiments, the feed gas comprises hydrogen, carbon monoxide and argon, and the activated carbon of the adsorbent adsorbs the carbon monoxide and argon.

In embodiments, the feed gas comprises hydrogen, carbon monoxide and oxygen, and the activated carbon of the adsorbent adsorbs the carbon monoxide and oxygen.

BRIEF DESCRIPTION OF SEVERAL VIEWS OF THE DRAWINGS

Not Applicable

DETAILED DESCRIPTION OF THE INVENTION

The invention provides an $H_2$ PSA process for the purification of a gas stream containing $H_2$ and CO, wherein $O_2$ and/or Ar are minor impurities of the gas stream which dictate $H_2$ purity in the product gas. The invention flows from the surprising discovery that activated carbon adsorbent is more effective than zeolite adsorbents in separating $H_2$ from CO, and $O_2$ and/or Ar, despite the fact that activated carbon is a non-polar adsorbent and zeolites are polar adsorbents conventionally understood to be most effective for adsorbing polar compounds such as CO.

In the $H_2$ PSA process of the invention, at least the discharge end adsorbent layer (i.e., the last adsorbent layer nearest the discharge end of the PSA device) is activated carbon. More preferably, the inlet adsorbent layer (i.e., the first adsorbent layer nearest the feed or inlet end of the PSA device) and the discharge end adsorbent layers are activated carbon. Most preferably, the total adsorption zone is activated carbon. The activated carbon adsorbent improves both the $H_2$ productivity and recovery of the PSA process over other adsorbents, as demonstrated in computer model simulations described below.

The following are preferred parameters for the process of the invention. The feed temperature is 0 to 40° C. The feed pressure is 100 to 1000 psig. The carbon bulk density is from 30 to 40 lbs/ft$^3$. The carbon particle diameter is from 1 to 3 mm. The number of beds is preferably from 4 to 6; however, the number of beds can be adjusted upward or downward to achieve a desired effect. Likewise, the number of pressure equalizations is preferably from 2 to 3; however, the number of pressure equalizations can be adjusted upward or downward to achieve a desired effect.

The feed gas preferably comprises $H_2$ and 0.01 to 10% $O_2$ and/or Ar, more preferably 40 to 98% $H_2$, 0.1 to 10% CO, and 0.01 to 10% $O_2$ and/or Ar, most preferably 40 to 95% $H_2$, 0.1 to 5% CO, and 0.01 to 10% $O_2$ and/or Ar. The expression "0 to n% $O_2$ and/or Ar" denotes that the feed gas can contain as much as n% $O_2$ in the absence of Ar, as much as n% Ar in the absence of $O_2$, or as much as n% $O_2$ and Ar combined. In certain embodiments, the feed gas can further comprise 0.1 to 5% $N_2$.

One preferred feed gas consists essentially of 40 to 95% hydrogen, 0.1 to 5% carbon monoxide, 0.01 to 10% oxygen, 0 to 5% nitrogen, 0 to 10% carbon dioxide and 0 to 10% methane. Another preferred feed gas consists essentially of 40 to 95% hydrogen, 0.1 to 5% carbon monoxide, 0.01 to 10% argon, 0 to 5% nitrogen, 0 to 10% carbon dioxide and 0 to 10% methane.

The product gas of the invention preferably comprises at least 99.9% $H_2$, more preferably at least 99.99% $H_2$.

The invention will be illustrated in more detail with reference to the following Examples, but it should be understood that the present invention is not deemed to be limited thereto.

EXAMPLE 1

An adsorption process simulator was used to predict $H_2$ PSA performance for a feed gas composition of 118 ppm Ar, 497 ppm $N_2$, 5.6% CO and 94.3% $H_2$. The feed pressure was 300 psig and temperature 70° F. Using a 5-bed PSA cycle with 2 countercurrent equalizations, different adsorbents were screened for process performance. The results of the simulation for the adsorbents tested for an $H_2$ product with 0.5 ppm Ar are given in the table below.

| Adsorbent(s) | Gravimetric $H_2$ Productivity | Volumetric $H_2$ Productivity | $H_2$ Recovery |
| --- | --- | --- | --- |
| 100% CaA | 1.0 | 1.0 | — |
| 50% CaA/50% CaX | 1.09 | 1.07 | +1.3 |
| 100% CaX | 0.98 | 0.98 | −1.0 |
| 50% CaA/50% C | 1.31 | 1.11 | +1.7 |
| 100% C | 1.49 | 1.25 | +3.2 |

The base case showed the use of CaA (5A) zeolite as the PSA adsorbent. When 50% of the CaA bed was replaced with CaX, the volumetric $H_2$ productivity (lb-moles of $H_2$/volume of bed) increased 7% and the $H_2$ recovery increased 1.3 points. When 50% of the CaA bed was replaced with activated carbon (bulk density of 30 lbs/ft$^3$), the volumetric $H_2$ productivity increased 11% and the $H_2$ recovery increased 1.7 points. Use of an all activated carbon bed resulted in a 25% increase in volumetric $H_2$ productivity and a 3.2 recovery point increase.

It is interesting that 100% CaX results in the worst performance even though CaX has a higher $N_2$ and Ar capacity than CaA. These results clearly show that activated carbon is the preferred adsorbent when Ar impurity is limiting PSA performance. The improvement in performance is surprising given the presence of both $N_2$ and CO in the feed gas stream. The prior art teaches that zeolites are the preferred discharge end adsorbents when CO and $N_2$ are minor adsorbable impurities.

EXAMPLE 2

An adsorption process simulator was used to estimate $H_2$ PSA performance with the following feed gas conditions: 89% $H_2$, 8% $CO_2$, 2% $CH_4$, 0.3% $N_2$ and 0.025% $O_2$. A 6-bed PSA cycle with two equalizations was employed. The $H_2$ purity was 2 ppm $O_2$. The results of the simulation are given in the table below.

| Adsorbents | Gravimetric $H_2$ Productivity | Volumetric $H_2$ Productivity | $H_2$ Recovery |
| --- | --- | --- | --- |
| 52% C/48% CaA | 1.0 | 1.0 | — |
| 42% C/27% CaA/31% C | 1.21 | 1.12 | +2.0 |
| 100% C | 1.55 | 1.28 | +4.3 |

A base case using an adsorption zone with a bed mixture of 52% activated carbon and 48% CaA (prior art arrangement) was employed. When a final layer of activated carbon was placed on top of the CaA, the $H_2$ recovery increased 2 points and the volumetric $H_2$ productivity increased 12%. When an all activated carbon adsorption zone was employed, the volumetric productivity increased 28% and the recovery increased 4.3 points. The results clearly show that when the $H_2$ PSA performance is governed by $O_2$ breakthrough, using solely activated carbon as the adsorbent results in improved performance.

The hydrogen product collecting is terminated when a substantial amount of at least one of argon and oxygen breaks through the pressure swing adsorption apparatus. Preferably, the substantial amount is about 1000 ppm of at least one of argon and oxygen. More Preferably the substantial amount is about 100 ppm of at least one of argon and oxygen. Even more preferably the substantial amount is about 10 ppm of at least one of argon and oxygen. Most preferably, the substantial amount is about 1 ppm of at least one of argon and oxygen.

Thus, the present invention comprises the use of activated carbon adsorbent to improve the efficiency of $H_2$ PSA.

While the invention has been described in detail and with reference to specific examples thereof, it will be apparent to one skilled in the art that various changes and modifications can be made therein without departing from the spirit and scope thereof.

What is claimed is:

1. A pressure swing adsorption process comprising:
   providing a pressure swing adsorption apparatus comprising a discharge end adsorption layer consisting essentially of activated carbon;
   feeding through said pressure swing adsorption apparatus a feed gas comprising hydrogen, carbon monoxide and 0.01 to 10% of at least one of argon and oxygen;
   collecting a product gas from said pressure swing adsorption apparatus, wherein said product gas consists essentially of hydrogen.

2. The process of claim 1, wherein said feed gas comprising hydrogen, carbon monoxide and 0.01 to 10% of at least one of argon and oxygen further comprises 40 to 98% hydrogen and 0.1 to 10% carbon monoxide.

3. The process of claim 2, wherein said feed gas further comprises 0.1 to 5% nitrogen.

4. The process of claim 1, wherein said feed gas comprising hydrogen, carbon monoxide and 0.01 to 10% of at least one of argon and oxygen comprises 40 to 95% hydrogen, 0.1 to 5% carbon monoxide, and 0.1 to 10% of at least one of oxygen and argon.

5. The process of claim 1, wherein hydrogen recovery is at least 60%.

6. The process of claim 5, wherein said product gas comprises at least 99.9% hydrogen.

7. The process of claim 5, wherein said product gas comprises at least 99.99% hydrogen.

8. The process of claim 1, wherein said collecting is terminated when a substantial amount of at least one of argon and oxygen breaks through said pressure swing adsorption apparatus.

9. The process of claim 8, wherein said substantial amount is about 1000 ppm of at least one of argon and oxygen.

10. The process of claim 8, wherein said substantial amount is about 100 ppm of at least one of argon and oxygen.

11. The process of claim 8, wherein said substantial amount is about 10 ppm of at least one of argon and oxygen.

12. The process of claim 8, wherein said substantial amount is about 1 ppm of at least one of argon and oxygen.

13. The process of claim 1, wherein an initial impurity breakthrough is delayed relative to an initial impurity breakthrough of said process performed with a discharge end adsorption layer which does not consist essentially of activated carbon.

14. The process of claim 1, wherein a hydrogen recovery is higher than a hydrogen recovery of said process performed with a discharge end adsorption layer which does not consist essentially of activated carbon.

15. The process of claim 1, wherein all adsorption layers of said pressure swing adsorption apparatus consist essentially of activated carbon.

16. The process of claim 1, wherein an inlet adsorption layer of said pressure swing adsorption apparatus consists essentially of activated carbon.

17. The process of claim 16, wherein an intermediate adsorption layer of said pressure swing apparatus comprises a zeolite adsorbent.

18. The process of claim 1, wherein said feed gas including hydrogen, carbon monoxide, and at least 0.01 to 10% of one of argon and oxygen comprises hydrogen and 0.01 to 10% oxygen.

19. The process of claim 1, wherein said feed gas including hydrogen, carbon monoxide, and at least 0.01 to 10% of one of argon and oxygen consists essentially of 40 to 95% hydrogen, 0.1 to 5% carbon monoxide, 0.01 to 10% oxygen, 0 to 5% nitrogen, 0 to 10% carbon dioxide and 0 to 10% methane.

20. The process of claim 1, wherein said feed gas including hydrogen, carbon monoxide, and at least 0.01 to 10% of one of argon and oxygen comprises hydrogen and 0.01 to 10% of argon.

21. The process of claim 1, wherein said feed gas including hydrogen, carbon monoxide, and at least 0.01 to 10% of one of argon and oxygen consists essentially of 40 to 95% hydrogen, 0.1 to 5% carbon monoxide, 0.01 to 10% argon, 0 to 5% nitrogen, 0 to 10% carbon dioxide and 0 to 10% methane.

22. A method for decreasing an amount of impurities in a product gas from a pressure swing adsorption process for separating hydrogen from impurities in a feed gas including hydrogen, carbon monoxide, and at least 0.01 to 10% of one of argon and oxygen, said method comprising providing an improved adsorption layer in at least a discharge end of a pressure swing adsorption apparatus in which said pressure swing adsorption process is conducted, wherein said improved adsorption layer consists essentially of activated carbon in an amount effective to increase a time until initial impurity breakthrough and improve a hydrogen recovery of said process.

23. The method of claim 22, wherein said improved adsorption layer is substantially devoid of zeolites.

24. The method of claim 22, wherein said feed gas including hydrogen, carbon monoxide, and at least 0.01 to 10% of one of argon and oxygen comprises hydrogen, carbon monoxide and argon, and wherein said activated carbon of said adsorbent adsorbs said carbon monoxide and argon.

25. The method of claim 22, wherein said feed gas including hydrogen, carbon monoxide, and at least 0.01 to 10% of one of argon and oxygen comprises hydrogen, carbon monoxide and oxygen, and wherein said activated carbon of said adsorbent adsorbs said carbon monoxide and oxygen.

* * * * *